(12) United States Patent
Ormazabal et al.

(10) Patent No.: US 8,966,619 B2
(45) Date of Patent: Feb. 24, 2015

(54) PREVENTION OF DENIAL OF SERVICE (DOS) ATTACKS ON SESSION INITIATION PROTOCOL (SIP)-BASED SYSTEMS USING RETURN ROUTABILITY CHECK FILTERING

(75) Inventors: Gaston S. Ormazabal, New York, NY (US); Henning G. Schulzrinne, Leonia, NJ (US); Eilon Yardeni, Brooklyn, NY (US); Somdutt B. Patnaik, West New York, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1203 days.

(21) Appl. No.: 11/557,740

(22) Filed: Nov. 8, 2006

(65) Prior Publication Data

US 2008/0222724 A1    Sep. 11, 2008

(51) Int. Cl.
*H04L 29/06*    (2006.01)

(52) U.S. Cl.
CPC ........ *H04L 63/1458* (2013.01); *H04L 63/1466* (2013.01); *H04L 63/08* (2013.01); *H04L 63/1408* (2013.01); *H04L 2463/141* (2013.01); *H04L 63/145* (2013.01); *H04L 63/1441* (2013.01); *H04L 63/1416* (2013.01)
USPC .................... 726/22; 726/23; 726/24; 726/25

(58) Field of Classification Search
CPC . H04L 63/1466; H04L 63/1458; H04L 63/08; H04L 2463/141; H04L 63/1416; H04L 63/1408; H04L 63/145; H04L 63/1441
USPC ......................................................... 726/22
See application file for complete search history.

(56) References Cited

U.S. PATENT DOCUMENTS

| | | |
|---|---|---|
| 5,414,704 A | 5/1995 | Spinney |
| 5,465,286 A | 11/1995 | Clare et al. |
| 5,473,607 A | 12/1995 | Hausman et al. |
| 5,828,653 A | 10/1998 | Goss |
| 5,859,980 A | 1/1999 | Kalkunte |
| 5,909,686 A | 6/1999 | Muller et al. |
| 5,936,962 A | 8/1999 | Haddock et al. |
| 5,991,270 A | 11/1999 | Zwan et al. |
| 6,154,775 A | 11/2000 | Coss et al. |
| 6,175,902 B1 | 1/2001 | Runaldue et al. |
| 6,680,089 B2 | 1/2004 | Miyake et al. |
| 6,701,346 B1 | 3/2004 | Klein |
| 6,707,817 B1 | 3/2004 | Kadambi et al. |
| 6,816,910 B1 | 11/2004 | Ricciulli |
| 6,826,616 B2 | 11/2004 | Larson et al. |
| 6,880,089 B1 | 4/2005 | Bommareddy et al. |
| 6,920,107 B1 | 7/2005 | Qureshi et al. |
| 6,930,598 B2 | 8/2005 | Weiss |
| 6,934,756 B2 | 8/2005 | Maes |

(Continued)

OTHER PUBLICATIONS

Sisalem, Dorgham, Jiri Kuthan, and Sven Ehlert. "Denial of Service Attacks Targeting a SIP VoIP Infrastructure: Attack Scenarios and Prevention Mechanisms." IEEE Network, vol. 20, Issue: 5, Publication Year: 2006, pp. 26-31.*

(Continued)

*Primary Examiner* — Taghi Arani
*Assistant Examiner* — Narciso Victoria

(57) ABSTRACT

A device receives an attack on a Session Initiation Protocol (SIP)-based device, determines a type of the attack, and applies, based on the determined type of the attack, a return routability check filter to the attack.

22 Claims, 6 Drawing Sheets

(56) References Cited

U.S. PATENT DOCUMENTS

| | | |
|---|---|---|
| 7,007,299 B2 | 2/2006 | Ioele et al. |
| 7,072,291 B1 | 7/2006 | Jagadeesan et al. |
| 7,076,393 B2 | 7/2006 | Ormazabal et al. |
| 7,254,832 B1 | 8/2007 | Christie |
| 7,340,166 B1 | 3/2008 | Sylvester et al. |
| 7,385,927 B2 | 6/2008 | Gygi et al. |
| 7,385,931 B2 | 6/2008 | Magnaghi et al. |
| 7,421,734 B2 | 9/2008 | Ormazabal et al. |
| 7,440,573 B2 | 10/2008 | Lor et al. |
| 7,499,405 B2 | 3/2009 | Gilfix et al. |
| 7,634,249 B2 | 12/2009 | Hahn et al. |
| 7,653,938 B1 | 1/2010 | Touitou et al. |
| 7,672,336 B2 | 3/2010 | Bharrat et al. |
| 7,716,725 B2 | 5/2010 | Xie |
| 7,721,091 B2 | 5/2010 | Iyengar et al. |
| 8,027,251 B2 | 9/2011 | Ormazabal et al. |
| 2002/0083187 A1 | 6/2002 | Sim et al. |
| 2002/0112073 A1 | 8/2002 | MeLampy et al. |
| 2002/0156903 A1 | 10/2002 | Bach Corneliussen |
| 2003/0009561 A1 | 1/2003 | Sollee |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093562 A1 | 5/2003 | Padala |
| 2003/0093563 A1 | 5/2003 | Young et al. |
| 2003/0115321 A1 | 6/2003 | Edmison et al. |
| 2003/0117961 A1 | 6/2003 | Chuah et al. |
| 2003/0120816 A1 | 6/2003 | Berthaud et al. |
| 2003/0126464 A1* | 7/2003 | McDaniel et al. ............ 713/201 |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0001443 A1 | 1/2004 | Soon et al. |
| 2004/0013086 A1 | 1/2004 | Simon et al. |
| 2004/0015579 A1 | 1/2004 | Cooper et al. |
| 2004/0028035 A1 | 2/2004 | Read |
| 2004/0034793 A1 | 2/2004 | Yuan |
| 2004/0039938 A1 | 2/2004 | Katz et al. |
| 2004/0068668 A1 | 4/2004 | Lor et al. |
| 2004/0128554 A1 | 7/2004 | Maher et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0236966 A1 | 11/2004 | D'Souza et al. |
| 2004/0244058 A1 | 12/2004 | Carlucci et al. |
| 2004/0255156 A1 | 12/2004 | Chan et al. |
| 2005/0018618 A1 | 1/2005 | Mualem et al. |
| 2005/0050377 A1 | 3/2005 | Chan et al. |
| 2005/0076235 A1 | 4/2005 | Ormazabal et al. |
| 2005/0165917 A1* | 7/2005 | Le et al. ...................... 709/220 |
| 2005/0201320 A1 | 9/2005 | Kiss et al. |
| 2005/0201357 A1 | 9/2005 | Poyhonen |
| 2005/0232229 A1* | 10/2005 | Miyamoto et al. ............ 370/351 |
| 2006/0007868 A1 | 1/2006 | Shinomiya |
| 2006/0013192 A1 | 1/2006 | Le et al. |
| 2006/0075084 A1 | 4/2006 | Lyon |
| 2006/0075132 A1 | 4/2006 | Liu |
| 2006/0077981 A1 | 4/2006 | Rogers |
| 2006/0146792 A1 | 7/2006 | Ramachandran et al. |
| 2006/0165060 A1 | 7/2006 | Dua |
| 2006/0227766 A1 | 10/2006 | Mickle et al. |
| 2007/0022479 A1 | 1/2007 | Sikdar et al. |
| 2007/0110053 A1 | 5/2007 | Soni et al. |
| 2007/0118894 A1 | 5/2007 | Bhatia |
| 2007/0121596 A1* | 5/2007 | Kurapati et al. .............. 370/356 |
| 2007/0192863 A1 | 8/2007 | Kapoor et al. |
| 2008/0037447 A1 | 2/2008 | Garg et al. |
| 2008/0040801 A1 | 2/2008 | Buriano et al. |

OTHER PUBLICATIONS

Rosenberg, et al., "SIP: Session Initiation Protocol", Internet Engineering Task Force, Request for Comments 3261, Jun. 2002.

Kuthan, et al., "Middlebox Communication: Framework and Requirements-Internet Draft," Internet Engineering Task Force (IETF), http://tools.ietf.org/html/draft-kuthan-midcom-framework-00, 26 pages, Nov. 2000.

* cited by examiner

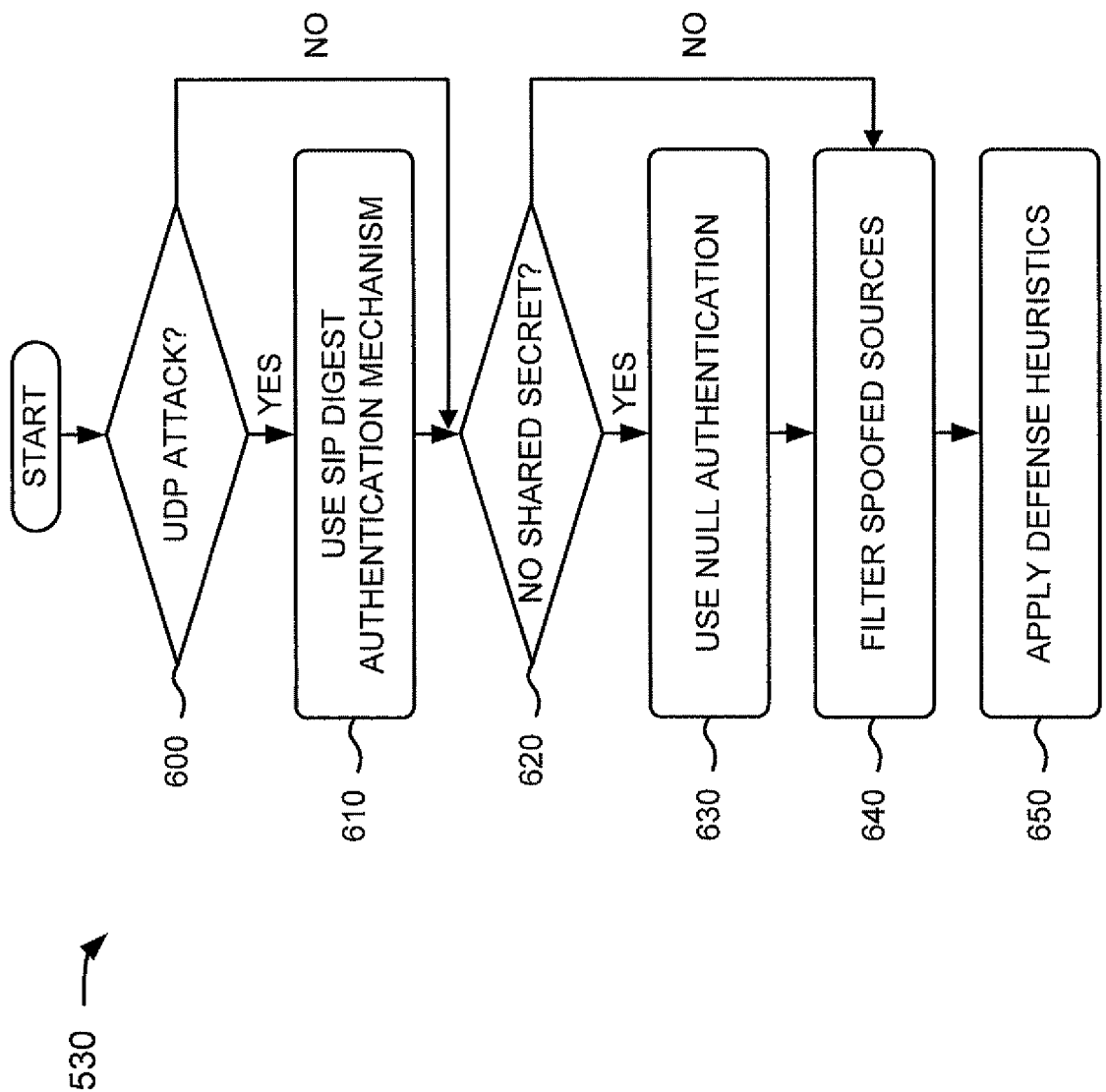

US 8,966,619 B2

PREVENTION OF DENIAL OF SERVICE (DOS) ATTACKS ON SESSION INITIATION PROTOCOL (SIP)-BASED SYSTEMS USING RETURN ROUTABILITY CHECK FILTERING

BACKGROUND INFORMATION

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Denial of Service (DoS) attacks may be characterized by explicit attempts of attackers to prevent legitimate users from using a service. DoS attacks continue to be the main threat facing network operators. As telephony services move to IP (Internet Protocol) networks, Voice over IP (VoIP) infrastructure components and end devices, may become attractive DoS attack targets. For example, carriers have begun a program for the delivery of advanced voice and data services over IP that implements security measures in order to protect both the service providing the network assets, as well as the customer networks from service disruption. As service providers develop value added revenue sources based on IP application services, the open nature of the IP infrastructure may put those revenue sources at risk. VoIP is the first, and most prominent of these IP application services. Availability means that the service is there when desired. With voice traveling over an Internet-based network (VoIP), issues such as DoS and distributed DoS attacks represent a significant threat to the availability of the services. DoS may be attempts to disable the functionality of a target, as opposed to gaining operational control of the target. As such, DoS attacks may be more difficult to defend against than traditional invasive exploits. There are already known SIP-based signaling attacks against VoIP, and the protocol itself may be vulnerable to software exploits and persistent protocol transactions that degrade its performance.

There may be three basic types of DoS attacks that might occur over a VoIP network: (1) exploiting implementation flaws (e.g., ping-of-death attack, invalid call setup messages, invalid media, malformed signaling, etc.); (2) exploiting application level vulnerability (e.g., registration hijacking, call hijacking, modify media sessions, session teardown, amplification attacks, media stream attacks, etc.); and (3) flooding (e.g., SIP channel flooding, RTP channel flooding, etc.). These attacks may target a VoIP component, such as a SIP proxy, or a supporting server, such as a Domain Name System (DNS) server, a Directory server, or a Dynamic Host Configuration Protocol (DHCP) server. A DoS attack against a supporting server could affect the VoIP service in different ways. For example, an attack against a certain domain's DNS server could deny VoIP calls destined to users in that domain. Another example could be an attack against a Directory Service, which is used by a SIP proxy server to store address-of-record to UA mappings, and could result in Denial-of-Service to the UAs that registers to this proxy.

BRIEF DESCRIPTION OF THE DRAWINGS

FIGS. 5 and 6 are flowcharts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may detect and prevent DoS attacks on SIP-based systems. For example, the systems and methods may be capable of distinguishing between valid traffic and DoS attack traffic, may differentiate between attacking packets and legitimate ones by comparing current traffic with a nominal traffic profile, may recognize when a DoS attack has been initiated, and may determine the form of the DoS attack. The systems and methods may also prevent a DoS attack from impacting the performance of a targeted VoIP infrastructure component (e.g., a SIP proxy). The systems and methods may use statistical analysis and application layer (i.e., layer 7 of the Open System Interconnection (OSI) model) inspection and analysis for detection of attacks.

Figure 1:
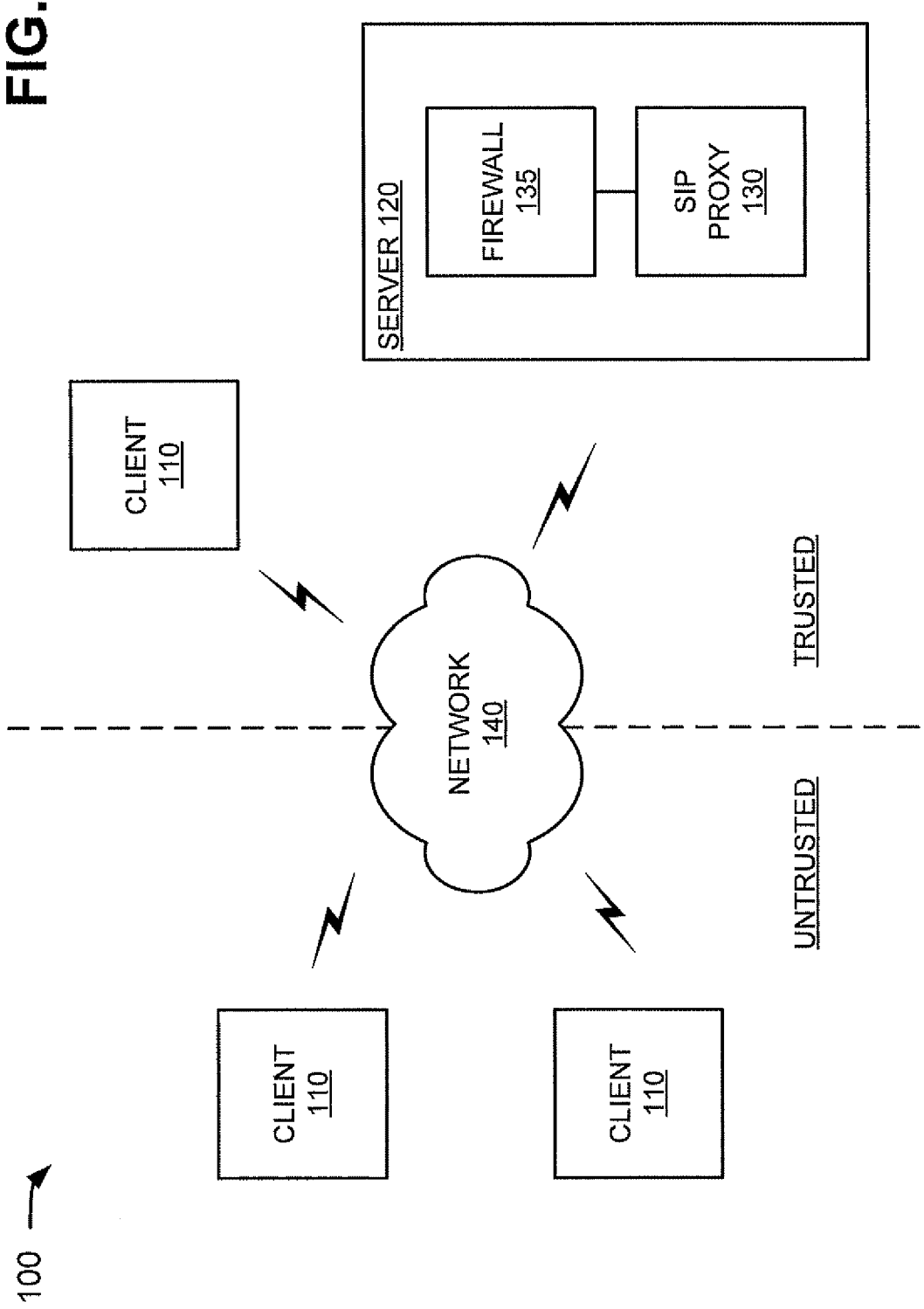
FIG. 1 depicts an exemplary network in which systems and methods described herein may be implemented.

FIG. 1 depicts an exemplary network 100 in which systems and methods described herein may be implemented. Network 100 may include multiple clients 110 connected to multiple servers (e.g., a server 120) via a network 140. Two clients 110 and one server 120 have been illustrated as connected to network 140 for simplicity. In practice, there may be more or fewer clients and servers. Also, in some instances, a client may perform one or more functions of a server and/or a server may perform one or more functions of a client.

Network 140 may include a local area network (LAN), a wide area network (WAN), a telephone network, such as the Public Switched Telephone Network (PSTN), an intranet, the Internet, a SIP-based network, a VoIP-based network, an IVR-based network, or a combination of networks. Clients 110 and server 120 may connect to network 140 via wired, wireless, and/or optical connections.

Clients 110 may include client entities. An entity may be defined as a device, such as a personal computer, a SIP telephone, a wireless telephone, a personal digital assistant (PDA), a lap top, or another type of computation or communication device, a thread or process running on one of these devices, and/or an object executable by one of these devices.

Server 120, also commonly referred to as a network server, may include a device that facilitates the establishment of SIP calls, or a device that is capable of facilitating SIP-based communications, e.g., Internet-based telephone calls, multimedia distribution, multimedia conferences, instant messaging conferences, interactive voice response (IVR), automated and manual operator services, automatic call distribution, call routing, etc.

Server 120 may include a server entity that gathers, processes, searches, and/or maintains applications (e.g., a high-speed, high-capacity packet processing applications server). As further shown in FIG. 1, server 120 may include a SIP proxy 130 and a firewall 135. SIP proxy 130 may include a device that facilitates the establishment of SIP calls. As described in the Internet Engineering Task Force (IETF) document RFC 3261, server 120 may act as both a server and a client for the purpose of making requests on behalf of other clients. Requests may be serviced internally or by passing them on, possibly after translation, to other servers. Server 120 may interpret, and, if necessary, rewrite a request message before forwarding it.

Firewall 135 may include a device which may be configured to permit, deny, and/or proxy data connections set and configured to prevent, e.g., DoS attacks. Firewall 135 may be hardware and/or software based. A basic task of firewall 135 may be to control traffic between devices (e.g., clients 110) of network 140 with different zones of trust. For example, as shown in FIG. 1, two clients 110 (to the left in FIG. 1) may reside in an untrusted or not trusted zone (e.g. the Internet), whereas client 110 (to the right in FIG. 1) and server 120 may reside in a trusted zone (e.g., an internal network). Firewall 135 may provide a controlled interface between zones of differing trust levels through the enforcement of a security policy and connectivity model based on the least privilege principle and separation of duties. In one implementation, firewall 135 may operate on data on behalf of an organizational network (e.g., a private network) and may prevent DoS attacks from untrusted sources. For example, firewall 135 may receive all, or substantially all, data destined for server 120 or trusted client 110 and/or transmitted by server 120 or trusted client 110.

The systems and methods described herein may utilize a deep-packet inspection filtering device (e.g., firewall 135), which may be deployed at the network perimeter, and may be capable of both detecting and filtering DoS attack attempts at carrier-class. Firewall 135 may include a high speed database using content addressable memory (CAM) technology for state table(s) storage. Firewall 135 may also utilize a Firewall Control Protocol (FCP) to update the state table(s) in firewall 135. Firewall 135 may further utilize packet logic manipulation that may be used to update the CAM state table(s).

Although FIG. 1 shows SIP proxy 130 as part of server 120, in other implementations, SIP proxy 130 may be a separate server entity that includes a device that facilitates the establishment of SIP calls, e.g., as described in RFC 3261. Furthermore, although FIG. 1 shows firewall 135 as part of server 120, in other implementations, firewall 135 may be a separate entity that includes a device which may be configured to permit, deny, and/or proxy data connections set and configured to prevent, e.g., DoS attacks. In still other implementations, firewall 135 may perform the functions of SIP proxy 130, or SIP proxy 130 may perform the functions of firewall 135.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as clients 110, connected to a network. Although SIP-type messages are shown for convenience, any type of protocol or a mixture of such protocols may be applied in various parts of the overall system.

Furthermore, in one implementation, firewall 135 may include the features set forth in co-pending application No. 11/557,703, entitled "SYSTEMS AND METHODS FOR IMPLEMENTING A PROTOCOL-AWARE NETWORK FIREWALL," filed on Nov. 8, 2006, the disclosure of which is incorporated by reference herein in its entirety. In another implementation, firewall 135 may include the features set forth in co-pending application No. 11/557,739, entitled "PREVENTION OF DENIAL OF SERVICE (DoS) ATTACKS ON SESSION INITIATION PROTOCOL (SIP)-BASED SYSTEMS USING METHOD VULNERABILITY FILTERING," filed on Nov. 8, 2006, the disclosure of which is incorporated by reference herein in its entirety.

Figure 2:
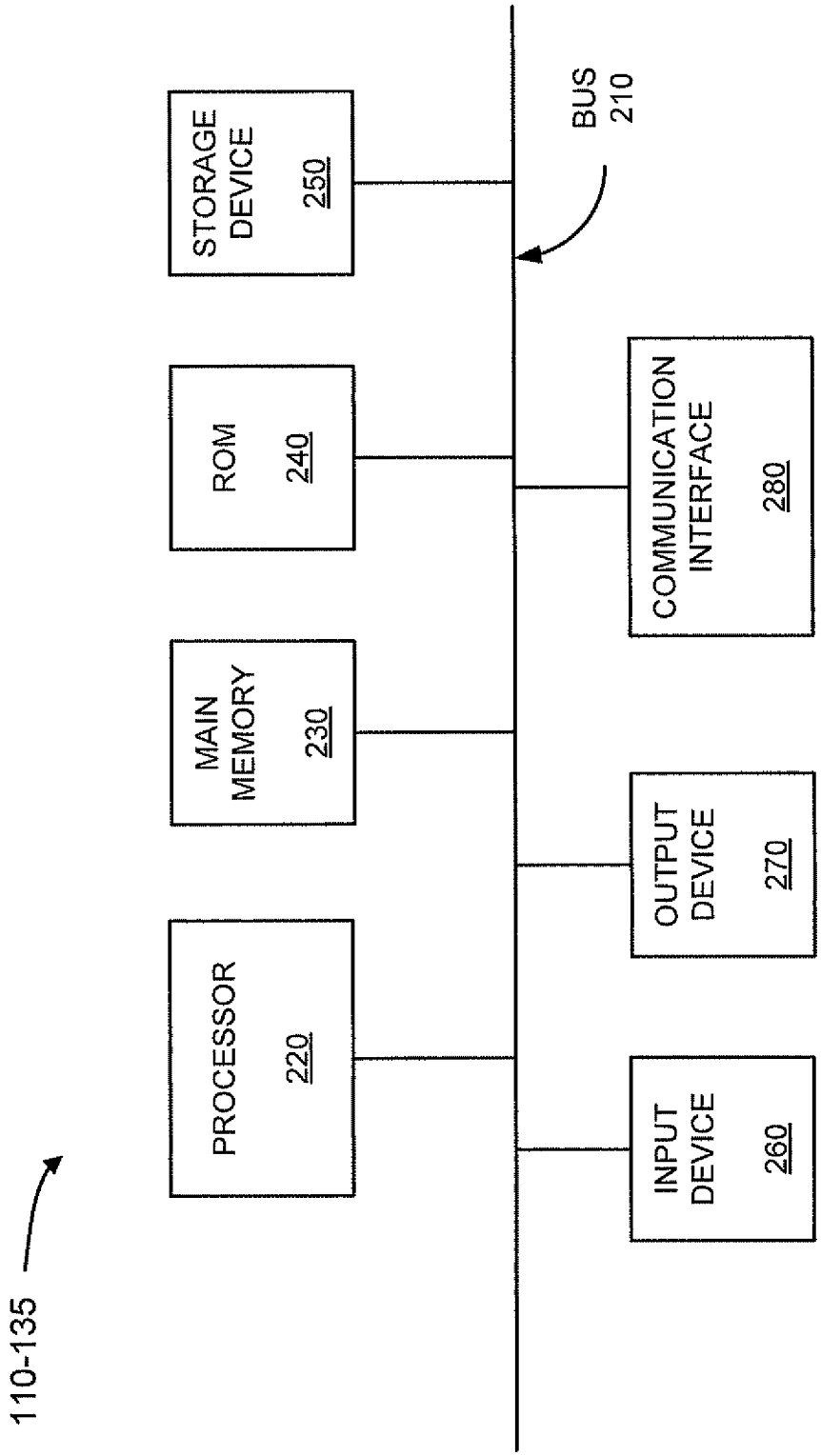
FIG. 2 depicts an exemplary device, client or server, configured to communicate via the exemplary network illustrated in FIG. 1.

FIG. 2 is an exemplary diagram of a client or server entity (hereinafter called "client/server entity"), which may correspond to one or more of clients 110, server 120, SIP proxy 130, and/or firewall 135. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain DoS detection and prevention operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

It may typically require many more resources to generate a flooding DoS attack than other DoS attacks. Flooding an access link may include hundreds or thousands of simultaneous individual streams coming from multiple machines geographically dispersed. As a preliminary step, the DoS attacker may need to take control over remote machines that can later be used to generate the attack. This preliminary attack may be accomplished using a worm or a Trojan horse. The machines comprised by a flooding DoS attack may be referred to as "zombies" or "bots," and their collection may form a "botnet." On the contrary, an implementation flaw DoS attack may utilize a single specially crafted packet, as in the case of the ping-of-death DoS attack.

Thus, it may be easier to defend against implementation flaw attacks since these attacks may use common attributes to exploit a software weakness. Application level and flooding attacks, on the other hand, may be more difficult to defend against when protecting SIP devices. Flooding attacks may be especially difficult because even the best-maintained system may become congested, thus denying service to legitimate users. The challenge is to distinguish between legitimate and malicious traffic and then prevent the malicious traffic from flooding the victim.

Given the diversity and broad range of attack methodologies, the systems and methods described herein focus on specific vulnerabilities that may be used by attackers for launching DoS attacks. Specifically, the systems and methods may detect and prevent lack of identity assurance-related vulnerabilities. An "identity," as the term is used herein, is to be broadly interpreted to include any end-point's source IP address. Many of the attacks described above may spoof the identity of the end users that originate SIP requests. A common vulnerability to SIP over User Datagram Protocol (UDP) may be the ability to spoof SIP requests resulting in several vulnerabilities (e.g., SIP spoof attacks, registration/call hijacking, session teardown, request flooding, error message flooding, SIP method vulnerabilities, etc.).

Figure 3:
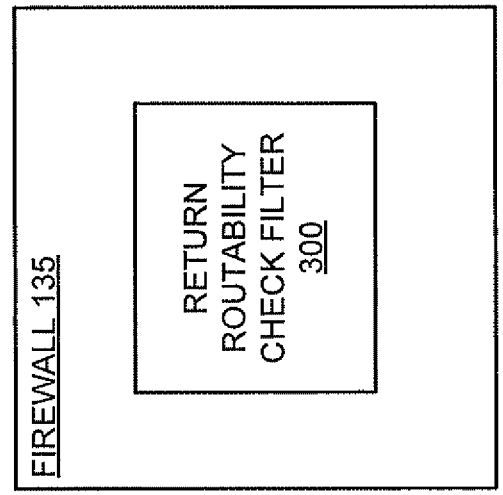
FIG. 3 is a diagram of exemplary components of a firewall of the exemplary server illustrated in FIG. 1.

To defend against the above vulnerabilities, firewall 135 may provide, as shown in FIG. 3, a rule-based detection and prevention (or mitigation) filter, i.e., a return routability check filter 300. Generally, return routability check filter 300 may use SIP's digest authentication mechanism for UDP, may use null authentication when a shared secret is not established, and may filter spoofed sources.

Although FIG. 3 shows an exemplary component of firewall 135, in other implementations firewall 135 may contain additional components that may permit detection and prevention of DoS attacks. In still other implementations, one or more components of firewall 135 may perform the tasks performed by other components of firewall 135.

Return routability check filter 300 may filter spoofed SIP requests as they enter the protected perimeter at carrier class rates. By ensuring that the identity of the SIP request is not spoofed, return routability check filter 300 may protect SIP entities against attacks such as registration hijacking and spoofed SIP INVITE request floods. Return routability check filter 300 may use three mechanisms to detect spoofed SIP identities.

A first mechanism used by return routability check filter 300 may include a SIP digest authentication mechanism for UDP. By using the SIP digest authentication mechanism, return routability check filter 300 may test return routability to an end point (e.g., untrusted client 110) that sent a SIP request. This may reduce the chances of the end-point source address being spoofed. SIP may provide a stateless, challenge-based mechanism for authentication that may be based on hypertext transfer protocol (HTTP) authentication. If SIP proxy 130 receives a SIP request, return routability check filter 300 may challenge the initiator of the request to provide assurance of its identity. The challenge may be sent in a "Proxy-Authorization" header field of a "407" "Proxy Authentication Required" response. The initiator may retry the SIP request with the proper credentials, e.g., a pre-shared secret (i.e., a password), in a "Proxy-Authorization" header field. The digest authentication mechanism may provide message authentication and may replay protection without message integrity or confidentiality.

A second mechanism used by return routability check filter 300 may include a "null authentication" mechanism that may authenticate an "anonymous" username with no password pre-shared secret (e.g., a password of " "). Return routability check filter 300 may therefore support "null authentication" in order to perform the routability check. To prevent state exhaustion in SIP proxy 130, return routability check filter 300 may keep no state until return routability is established.

A third mechanism used by return routability check filter 300 may reduce the risk of internally-fueled spoofed IP attacks by restricting the flow of data coming from the Internet (e.g., untrusted clients 110) if the data has source addresses from within an internal network(s) (e.g., trusted portion of network 100). Thus, return routability check filter 300 may be configured with the network addresses of the internal network(s).

Furthermore, return routability check filter 300 may apply several defense heuristics. For example, return routability check filter 300 may block incoming emergency calls that specify the same location information at the same (e.g., short) time interval. In another example, return routability check filter 300 may block incoming emergency calls that originate at the same source IP address at a given (e.g., short) time interval. In still another example, return routability check filter 300 may block emergency calls coming from unauthorized subnets that do not match a pre-configured location of a protected network (e.g., the trusted portion of network 100). For instance, if return routability check filter 300 is protecting a network that resides in the Washington D.C. area, return routability check filter 300 may block an emergency call with a source IP address that maps to a network that is located in Australia.

If digest authentication is used, the rate at which firewall 135 can handle incoming SIP requests may decrease for every incoming SIP request for which firewall 135 computes a new challenge or validates the provided authorization data. An attack flood of spoofed INVITE messages may overload firewall 135 since firewall 135 may be trying to authenticate each one of the SIP requests. Thus, return routability check filter 300 may detect the SIP request floods, and may apply a rate-limiting policy in order to reduce the load from SIP proxy 130. The type of rate-limiting policy applied by return routability check filter 300 may have a direct impact on the number of false-positives (e.g., "bad" requests that were not blocked) and/or true-positives (e.g., "good" requests that were filtered). In the rate-limiting policy applied by return routability check filter 300, a temporary filter may be established whenever a new SIP request needs to be authenticated. The temporary filter may be used to block further unauthenticated request attempts, coming from the same source, from reaching SIP proxy 130. If firewall 135 receives the request, return routability check filter 300 may respond with the digest authentication mechanism, and an FCP message to create the temporary filter. If the request originator successfully responds with the correct challenge response, return routability check filter 300 may remove the temporary filter from firewall 135. The temporary filter may have a short expiration date (e.g., on the order of seconds), and may based on the "From URI" or the source IP address.

Figure 4:
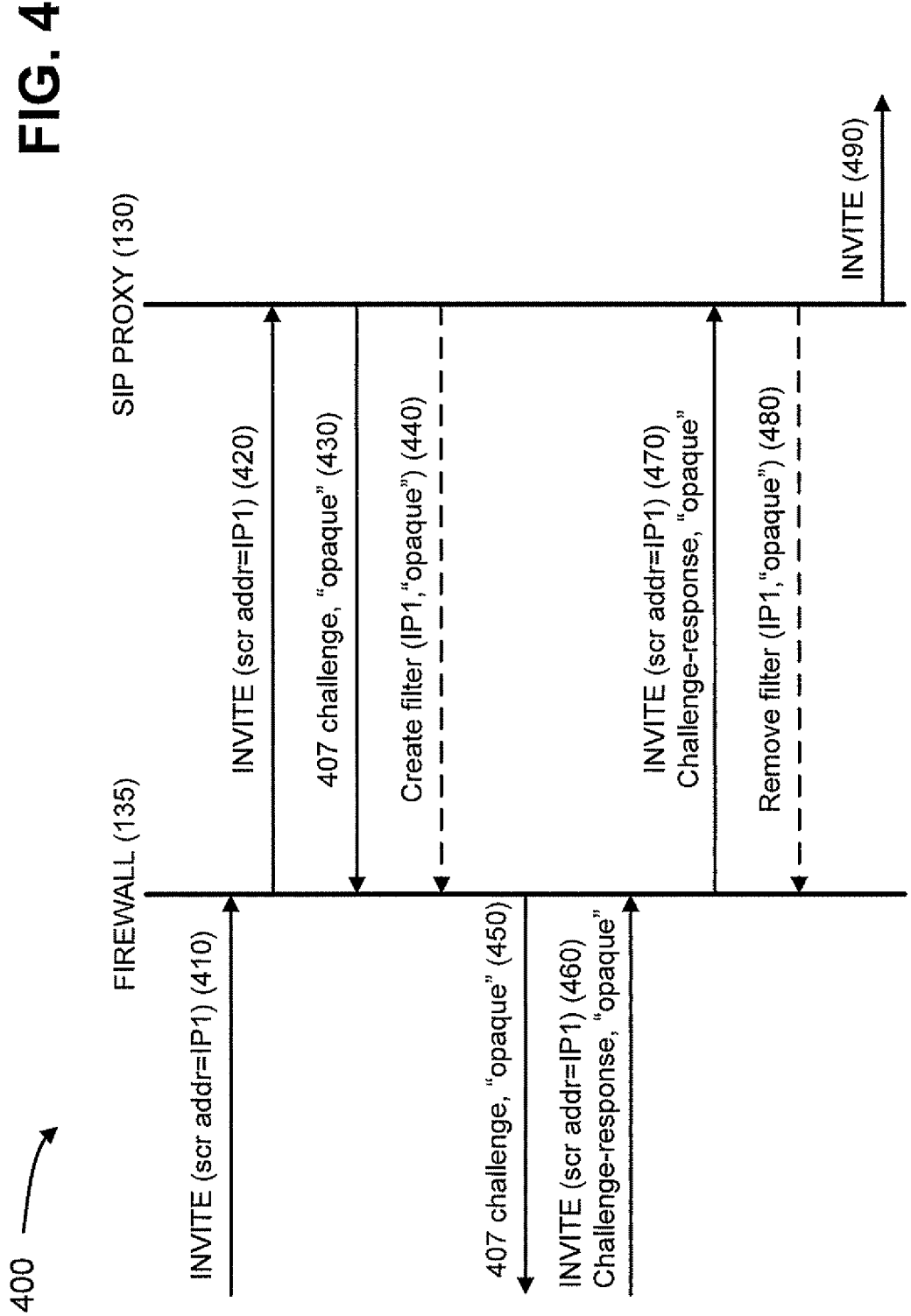
FIG. 4 is an exemplary call flow diagram between the firewall and a SIP proxy of the exemplary server illustrated in FIG. 1.

FIG. 4 is an exemplary call flow 400 between firewall 135 and SIP proxy 130. Call flow 400 may depict exemplary steps of a rate limiting message exchange for a temporary filter created by return routability check filter 300. As shown, firewall 135 may receive an INVITE request 410 with "IP1" as a source IP address. If firewall 135 does not find a match in a filter table, firewall 135 may forward request 410 (as indicated by reference number 420) to SIP proxy 130. SIP proxy 130 may receive INVITE request 420 for authentication, and may respond with a "407 message" that contains a challenge 430. SIP proxy 130 may send a FCP message 440 that requests creation of a temporary filter for blocking the request's source IP address (IP1). The temporary filter may also contain a "nonce" value that may be part of the authentication challenge and may be included unchanged in the authentication response.

As further shown in FIG. 4, firewall 135 may receive FCP message 440 and return routability check filter 300 may create the temporary filter that forwards a "407 message" challenge 450. Firewall 135 may receive a SIP request 460 and may attempt to match the source IP address with the IP address in the filter table. If there is a match, firewall 135 (e.g., return routability check filter 300 of firewall 135) may compare the "nonce" value from the authentication response with the "nonce" value included in the temporary filter. If the nonce values are equal, firewall 135 may forward request 460 (as shown by reference number 470) to SIP proxy 130. Otherwise, firewall 135 may block SIP request 460. SIP proxy 130 may successfully authenticate request 470, may send a FCP message 480 to firewall 135 that removes the temporary filter from firewall 135, and may forward on INVITE request 490.

Figure 5:
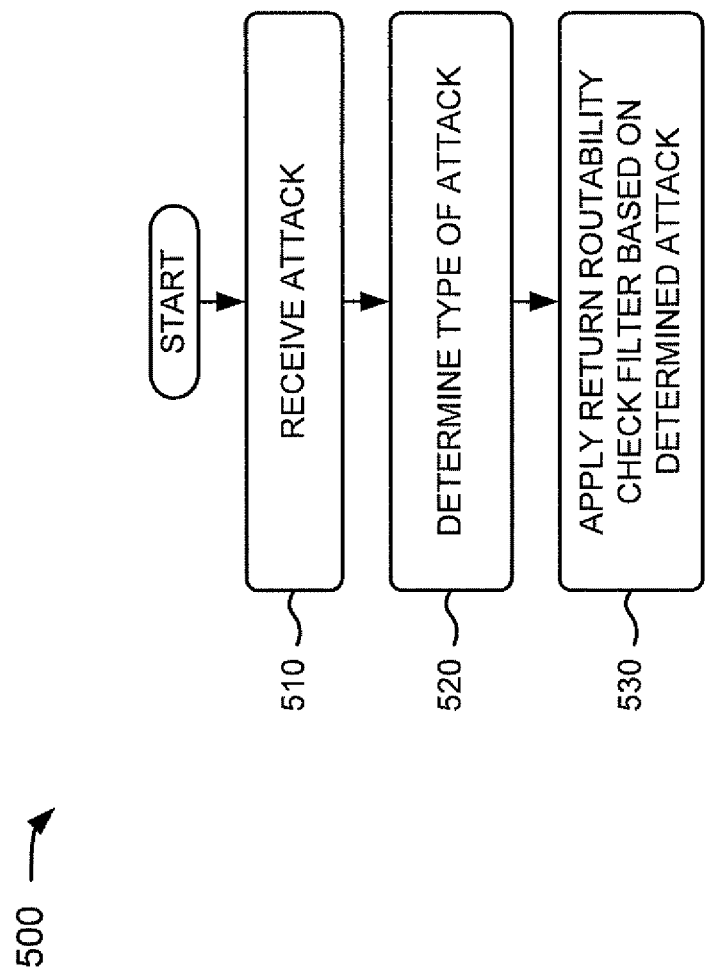

FIGS. 5 and 6 are flowcharts of exemplary processes capable of being performed by server 120, SIP proxy 130, firewall 135, or combinations of aforementioned devices. As shown in FIG. 5, a process 500 may receive an attack(s) (block 510) and may determine the type of attack (block 520). For example, in one implementation, firewall 135 may receive any of the DoS attacks described above, and may determine the type of DoS attack(s).

Process 500 may apply a return routability check filter to the determined attack(s) (block 530). For example, in one implementation described above in connection with FIG. 3, return routability check filter 300 may filter spoofed SIP requests as they enter the protected perimeter at carrier class rates. By ensuring that the identity of the SIP request is not spoofed, return routability check filter 300 may protect SIP entities against attacks, such as registration hijacking and spoofed SIP INVITE request floods. Return routability check filter 300 may use three mechanisms to detect spoofed SIP identities. For example, return routability check filter 300 may use SIP's digest authentication mechanism for UDP, may use null-authentication when a shared secret is not established, and may filter spoofed sources.

FIG. 6 shows the process blocks related to process block 530 of process 500. As shown, process block 530 may determine whether the attack is a UDP attack (block 600). If the attack is a UDP attack (block 600—YES), process block 530 may use a SIP digest authentication mechanism (block 610). For example, in one implementation described above in connection with FIG. 3, a first mechanism used by return routability check filter 300 may include a SIP digest authentication mechanism for UDP. By using the SIP digest authentication mechanism, return routability check filter 300 may test return routability to an end point (e.g., untrusted client 110) that sent a SIP request. This may reduce the chances of the end-point source address being spoofed. SIP may provide a stateless, challenge-based mechanism for authentication that may be based on hypertext transfer protocol (HTTP) authentication. The digest authentication mechanism may provide message authentication and may provide replay protection without message integrity or confidentiality.

If the attack is not a UDP attack (block 600—NO) or the SIP digest authentication mechanism was used (block 610), process block 530 may determine whether the attack lacks a shared secret (block 620). If the attack lacks a shared secret (block 620—YES), process block 530 may use a null authentication mechanism (block 630). For example, in one implementation described above in connection with FIG. 3, a second mechanism used by return routability check filter 300 may include a "null authentication" mechanism that may authenticate an "anonymous" username with no password pre-shared secret (e.g., a password of " "). Return routability check filter 300 may therefore support "null authentication" in order to perform the routability check. To prevent state exhaustion in SIP proxy 130, return routability check filter 300 may keep no state until return routability is established.

As further shown in FIG. 6, if the attack does not lack a shared secret (block 620—NO) or the null authentication mechanism was used (block 630), process block 530 may filter spoofed source type attacks (block 640). For example, in one implementation described above in connection with FIG. 3, a third mechanism used by return routability check filter 300 may reduce the risk of internally-fueled spoofed IP attacks by restricting the flow of data coming from the Internet (e.g., untrusted clients 110) if the data has source addresses from within an internal network(s) (e.g., trusted portion of network 100). Thus, return routability check filter 300 may be configured with the network addresses of the internal network(s).

Process block 530 may apply defense heuristics to the attack(s) (block 650). For example, in one implementation described above in connection with FIG. 3, return routability check filter 300 may apply several defense heuristics (e.g., return routability check filter 300 may block incoming emergency calls that specify the same location information at the same time interval; return routability check filter 300 may block incoming emergency calls that originate at the same source IP address at a given time interval; return routability check filter 300 may block emergency calls coming from unauthorized subnets that do not match a pre-configured location of a protected network; etc.).

Systems and methods described herein may detect and prevent DoS attacks on SIP-based systems. For example, the systems and methods may be capable of distinguishing between valid traffic and DoS attack traffic, may differentiate between attacking packets and legitimate ones by comparing current traffic with a nominal traffic profile, may recognize when a DoS attack has been initiated, and may determine the form of the DoS attack. The systems and methods may also prevent a DoS attack from impacting the performance of a targeted VoIP infrastructure component (e.g., a SIP proxy). The systems and methods may use statistical analysis and application layer (i.e., layer 7 of the OSI model) inspection and analysis for detection of attacks.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 5 and 6, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving an attack on a Session Initiation Protocol (SIP)-based device; and
   applying a return routability check filter to the attack, wherein applying the return routability check filter includes:
   receiving a first SIP request message from a source;
   storing, in a content-addressable memory (CAM) table, an identifier of the source indicated in the first SIP request message;
   transmitting a challenge to the source to authenticate the source;
   receiving additional SIP request messages;
   determining, for each of the additional SIP request messages, if the CAM table includes an entry that matches an identifier of the corresponding additional SIP request message;
   determining, for each of the additional SIP request messages that includes an identifier that matches an entry in the CAM table, if the corresponding additional SIP request message includes a correct response to the challenge;
   blocking the additional SIP request messages that include an identifier that matches an entry in the CAM table and do not include the correct response to the challenge; and
   removing the identifier of the source from the CAM table when one of the additional SIP request messages includes an identifier that matches an entry in the CAM table and includes the correct response to the challenge.

2. The method of claim 1, wherein the identifier of the source is an internet protocol (IP) address and the identifier of each of the additional SIP request messages is an IP address.

3. The method of claim 1, wherein the identifier of the source is a from-URI and the identifier of each of the additional SIP request messages is a from-URI.

4. The method of claim 1, wherein applying a return routability check filter includes:
   using a SIP digest authentication to challenge the source.

5. The method of claim 1, wherein applying the return routability check filter further includes:
   removing the identifier of the source from the CAM table after a time period if none of the additional SIP request messages includes the correct response to the challenge.

6. The method of claim 5, further comprising:
   blocking incoming emergency calls that specify identical location information at a substantially identical time interval;
   blocking incoming emergency calls that originate at an identical source IP address at a given time interval; or
   blocking incoming emergency calls coming from unauthorized subnets that do not match a pre-configured location of a protected network.

7. The method of claim 5, wherein blocking the additional SIP request messages includes preventing a forwarding of the additional SIP request messages to a SIP proxy or server to reduce a load on the SIP proxy or server.

8. The method of claim 1,
   wherein the first SIP request message includes an INVITE message and the additional SIP request messages include additional INVITE messages; and
   wherein blocking the additional SIP request messages includes dropping the additional INVITE messages.

9. A system comprising:
   a Session Initiation Protocol (SIP) proxy or server; and
   a firewall to receive an attack on the SIP proxy or server and to apply a return routability check filter to the attack, the firewall including:
   a receiver to receive a first SIP request message from a source and to receive additional SIP request messages;
   a transmitter to send a challenge to authenticate the source; and
   a content-addressable memory (CAM) to store a CAM table of identifiers of SIP request messages;
   a processor to
   store an identifier, indicated in the first SIP request message of the source, in the CAM table,
   determine, for each of the additional SIP request messages, if the CAM table includes an entry that matches an identifier included in the corresponding additional SIP request message;
   determine, for each of the additional SIP request messages that includes an identifier that matches an entry in the CAM table, if the corresponding additional SIP request message includes a correct response to the challenge;
   block the additional SIP request messages blocking that include an identifier that matches an entry in the CAM table and do not include the correct response to the challenge, and
   remove the identifier of the source from the CAM table when one of the additional SIP request messages includes an identifier that matches an entry in the CAM table and includes the correct response to the challenge.

10. The system of claim 9, wherein the identifier of the source is an Internet Protocol (IP) address and wherein the identifier of each of the additional SIP request messages is an IP address.

11. The system of claim 9, wherein the identifier of the source is a from-URI and the identifier of each of the additional SIP request messages is a from-URI.

12. The system of claim 9, wherein the attack comprises a denial of service (DoS) attack.

13. The system of claim 12, wherein the DoS attack includes spoofed SIP request messages.

14. The system of claim 9, wherein the processor removes the identifier of the source from the CAM table after a time period if the processor determines that none of the additional SIP request messages includes the correct response to the challenge.

15. The system of claim 9, wherein the processor is configured to use SIP digest authentication to challenge the source.

16. The system of claim 9,
wherein the first SIP request message includes an INVITE message and the additional SIP request messages include additional INVITE messages; and
wherein the processor is configured to drop the additional SIP INVITE messages.

17. The system of claim 9, wherein the processor is configured to:
block incoming emergency calls that specify identical location information at a substantially identical time interval;
block incoming emergency calls that originate at an identical source IP address at a given time interval; or
block incoming emergency calls coming from unauthorized subnets that do not match a pre-configured location of a protected network.

18. The system of claim 9,
wherein the processor is configured to prevent a forwarding of the additional SIP request messages to the SIP proxy or server to reduce a load on the SIP proxy or server.

19. A device comprising:
a receiver to receive a first Session Initiation Protocol (SIP) request message from a source and to receive subsequent additional SIP request messages; and
a transmitter to send a message to the Internet Protocol (IP) address identified in the first SIP request message for authenticating the source;
a content addressable memory (CAM) to store a CAM table of source IP addresses of SIP request messages; and
a processor to
store the source IP address identified in the first SIP request message in the CAM table,
determine, for each of the additional SIP request messages, if the CAM table includes an entry that matches a source IP address indicated in the corresponding additional SIP request message,
determine, for each of the additional SIP request messages that includes a source IP address that matches an entry in the CAM table, if the corresponding additional SIP request message includes a correct response to the challenge;
remove the IP address of the source from the CAM table when one of the additional SIP request messages includes a source IP address that matches an entry in the CAM table and includes the correct response to the challenge.

20. The device of claim 19, wherein the device includes:
a firewall; or
a SIP proxy and a firewall.

21. The device of claim 19, wherein the additional SIP request messages comprise a denial of service (DoS) attack.

22. The device of claim 19, wherein the processor removes the IP address of the source after a period of time if none of the additional SIP request messages include the correct response to the challenge.

* * * * *